United States Patent
Nakazono et al.

(10) Patent No.: US 9,329,384 B2
(45) Date of Patent: May 3, 2016

(54) OPTICAL REFLECTING ELEMENT AND ACTUATOR

(71) Applicant: PANASONIC CORPORATION, Osaka (JP)

(72) Inventors: Shinsuke Nakazono, Osaka (JP); Akira Kurozuka, Osaka (JP); Yuta Yamamoto, Osaka (JP); Kazuki Komaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/369,895

(22) PCT Filed: Mar. 11, 2013

(86) PCT No.: PCT/JP2013/001554
§ 371 (c)(1),
(2) Date: Jun. 30, 2014

(87) PCT Pub. No.: WO2013/136759
PCT Pub. Date: Sep. 19, 2013

(65) Prior Publication Data
US 2014/0368896 A1    Dec. 18, 2014

(30) Foreign Application Priority Data

Mar. 15, 2012 (JP) .................. 2012-058287

(51) Int. Cl.
| | | |
|---|---|---|
| *G02B 26/10* | (2006.01) | |
| *G02B 26/08* | (2006.01) | |
| *H04N 1/113* | (2006.01) | |

(52) U.S. Cl.
CPC .......... *G02B 26/105* (2013.01); *G02B 26/0858* (2013.01); *G02B 26/101* (2013.01); *H04N 1/113* (2013.01)

(58) Field of Classification Search
CPC ........... G02B 26/0858; G02B 26/0833; G02B 26/101; G02B 26/105
USPC .......... 359/196.1, 198.1, 199.1, 199.2, 213.1, 359/224.1, 221.2
See application file for complete search history.

(56) References Cited

U.S. PATENT DOCUMENTS

| 2005/0220394 A1 | 10/2005 | Yamamoto et al. |
| 2008/0074650 A1 | 3/2008 | Fujihara et al. |

(Continued)

FOREIGN PATENT DOCUMENTS

| CN | 1677158 | 10/2005 |
| CN | 101153821 | 4/2008 |

(Continued)

OTHER PUBLICATIONS

International Search Report issued in International Application No. PCT/JP2013/001554 with Date of mailing Apr. 2, 2013, with English Translation.

(Continued)

*Primary Examiner* — Darryl J Collins
*Assistant Examiner* — Journey Sumlar
(74) *Attorney, Agent, or Firm* — McDermott Will & Emery LLP

(57) ABSTRACT

An optical reflecting device includes a movable plate having a reflecting surface, a first support portion, a first drive part, a first frame, and a monitor part for detecting the rotation of the movable plate. The first support portion is connected to the movable plate. The first drive part is formed in the first support portion and rotates the movable plate about a first axis. The first frame contains the movable plate and the first support portion, and is connected to the first support portion. The monitor part extends from that portion of the outer periphery of the movable plate which is most distant from the first axis.

13 Claims, 7 Drawing Sheets

(56) References Cited

U.S. PATENT DOCUMENTS

| | | |
|---|---|---|
| 2009/0180168 A1* | 7/2009 | Kurozuka et al. .......... 359/221.2 |
| 2009/0185253 A1* | 7/2009 | Tani et al. .................. 359/221.2 |
| 2011/0122471 A1 | 5/2011 | Terada et al. |
| 2013/0050791 A1 | 2/2013 | Nakazono et al. |

FOREIGN PATENT DOCUMENTS

| | | |
|---|---|---|
| CN | 201322610 Y | 10/2009 |
| CN | 101790840 | 7/2010 |
| CN | 101852917 | 10/2010 |
| JP | 2005-326465 A | 11/2005 |
| JP | 2007-307662 A | 11/2007 |
| JP | 2007307662 A * | 11/2007 |
| JP | 2009-077595 A | 4/2009 |
| JP | 2009-093120 A | 4/2009 |
| JP | 2009-169325 A | 7/2009 |
| JP | 2011-150055 A | 8/2011 |
| JP | 2011-209583 A | 10/2011 |
| JP | 2006-085152 A | 6/2014 |

OTHER PUBLICATIONS

English Translation of Chinese Search Report dated Jan. 4, 2016 for the related Chinese Patent Application No. 201380013690.8.

* cited by examiner

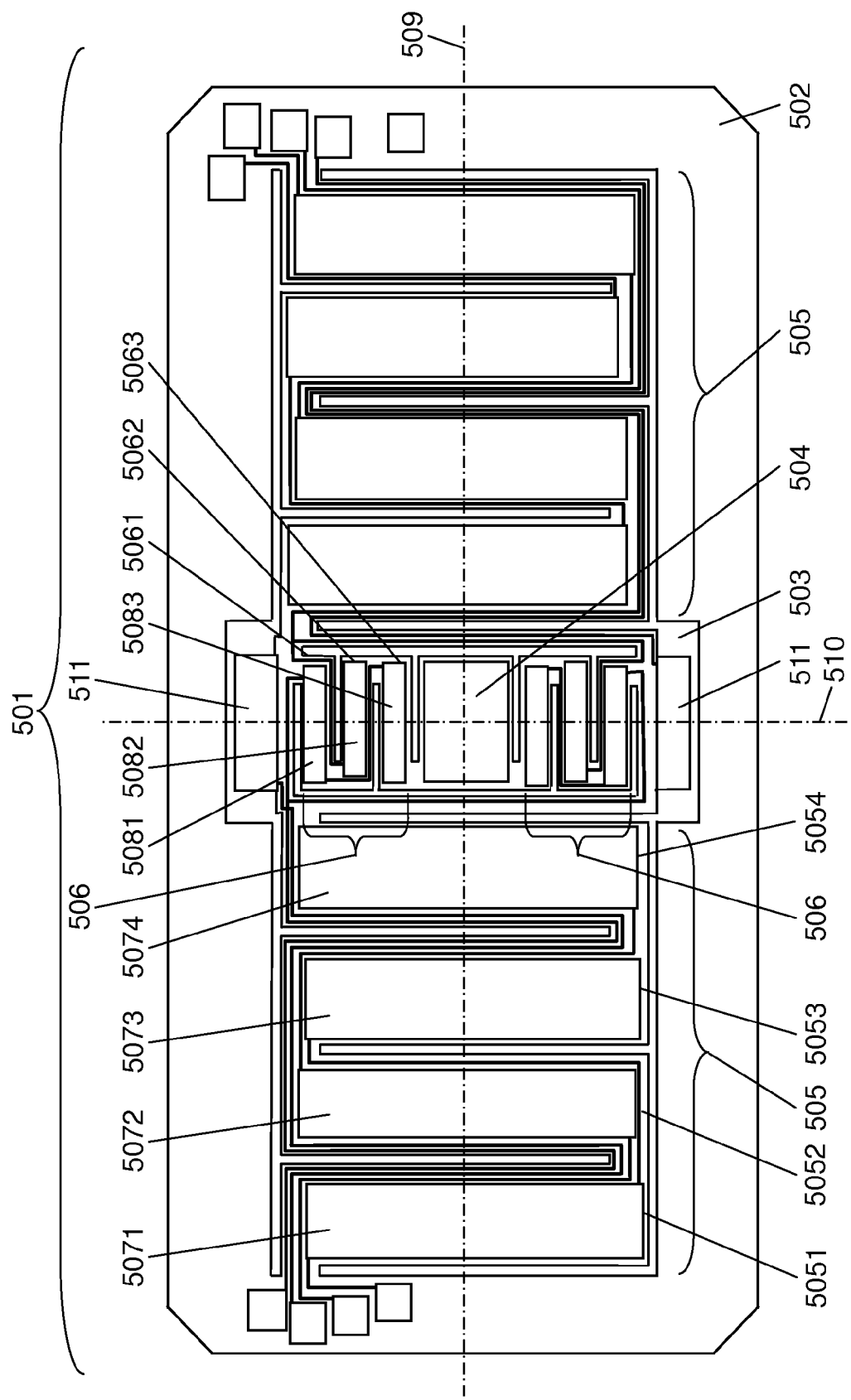

OPTICAL REFLECTING ELEMENT AND ACTUATOR

This application is a national phase of International Application No. PCT/JP2013/001554, filed on Mar. 11, 2013, which in turn claims the benefit of Japanese Application No. 2012-058287, filed on Mar. 15, 2012, the disclosures of which Applications are incorporated by reference herein.

TECHNICAL FIELD

The present invention relates to an optical reflecting device for use in a laser printer, a bar-code reader, or an image projection device such as a head-up display or a head-mounted display. The present invention also relates to an actuator having a similar structure to the optical reflecting device.

BACKGROUND ART

Optical scanners, which scan a light flux emitted from a light source such as a laser or a light-emitting diode, are used in practical applications. These optical scanners are classified into a one-dimensional scanning type such as a laser printer or a bar-code reader, and a two-dimensional scanning type such as an in-car radar or a projection display device. For these optical scanners, it is important to detect the position of the mirror surface, and hence, various efforts have been made to provide a monitoring function for achieving this detection.

For example, Patent Literature 1 discloses a method of detecting the position of the mirror surface by providing a light receiving element outside the device, and making the light receiving element receive the light reflected from the device.

Patent Literature 2 discloses a method of detecting the position of the mirror surface by providing a monitoring element such as a piezoresistive element or a piezoelectric element at a position where torsion or bending occurs when the mirror surface is driven.

Patent Literature 3 discloses an invention for detecting the rotation state of the mirror part by providing a piezoelectric sensor connected to the mirror part and to the torsion bar for rotating the mirror part. Patent Literature 4 discloses an invention including a piezoelectric sensor disposed outside the outer periphery of the mirror via a slit in order to solve the problem of Patent Literature 3.

CITATION LIST

Patent Literatures

Patent Literature 1: Japanese Unexamined Patent Publication No. 2009-93120
Patent Literature 2: Japanese Unexamined Patent Publication No. 2009-77595
Patent Literature 3: Japanese Unexamined Patent Publication No. 2009-169325
Patent Literature 4: Japanese Unexamined Patent Publication No. 2011-150055

SUMMARY OF THE INVENTION

An object of the present invention is to provide an optical reflecting device that directly detects the motion of the mirror surface without reducing the drive efficiency of the mirror and that has a monitoring structure with a high degree of design freedom, imposing no restrictions on the method of connecting the mirror part and the support body.

The optical reflecting device of the present invention includes a movable plate having a reflecting surface, a first support portion, a first drive part, a first frame, and a monitor part for detecting the rotation of the movable plate. The first support portion is connected to the movable plate. The first drive part is provided on the first support portion and capable of rotating the movable plate about a first axis. The movable plate and the first support portion are located in the first frame, and the first frame is connected to the first support portion. The monitor part extends from a portion, which is most distant from the first axis, of the outer periphery of the movable plate.

In this configuration, the monitor part is deformed by the inertia force generated when the movable plate rotates. In other words, the optical reflecting device itself has a monitoring function, allowing the display system to be small. Furthermore, since the monitor part is deformed by the inertia force generated by the motion of the reflecting surface, the motion of the reflecting surface can be detected directly. The monitor part is provided in a region other than the region where the monitor part is deformed by the rotation. This suppresses a decrease in the drive efficiency and reduces power consumption. Furthermore, since the monitor part is connected only to the portion, which is most distant from the rotation axis, of the mirror part, no restrictions are imposed on the method of connecting the mirror part and the fixed frame. As a result, the optical reflecting device has a high degree of design freedom.

BRIEF DESCRIPTION OF DRAWINGS

FIG. 6 is a top view of an optical reflecting device according to a second exemplary embodiment of the present invention.

DESCRIPTION OF EMBODIMENTS

Problems with the conventional techniques will now be described prior to describing the exemplary embodiments of the present invention. First, according to the monitoring method of Patent Literature 1 in which the light receiving element is provided outside, a large system is required. According to Patent Literature 2 in which the detection is performed by the monitoring element provided at the region where torsional or bending deformation occurs when the mirror surface is driven, the monitoring element may hinder the deformation thereby decreasing the drive efficiency. Moreover, since the motion of the mirror is not directly detected, the detected motion may not correspond to the motion of the mirror.

According to Patent Literature 3 in which the rotation state of the mirror part is detected by providing the piezoelectric sensor connected to the mirror part and to the torsion bar for rotating the mirror part, the stress applied to the piezoelectric sensor is low, thereby generating a low signal. According to Patent Literature 4 in which the piezoelectric sensor is provided outside the outer periphery of the mirror via a slit, the device needs to be of large size because the piezoelectric sensor is disposed outside the outer periphery of the mirror. Furthermore, in the configurations of Patent Literatures 3 and 4, the piezoelectric sensor is coupled to the support portion which connects the mirror and the support body. This decreases the degree of design freedom of the part that connects the mirror and the support body.

First Exemplary Embodiment

Figure 1:
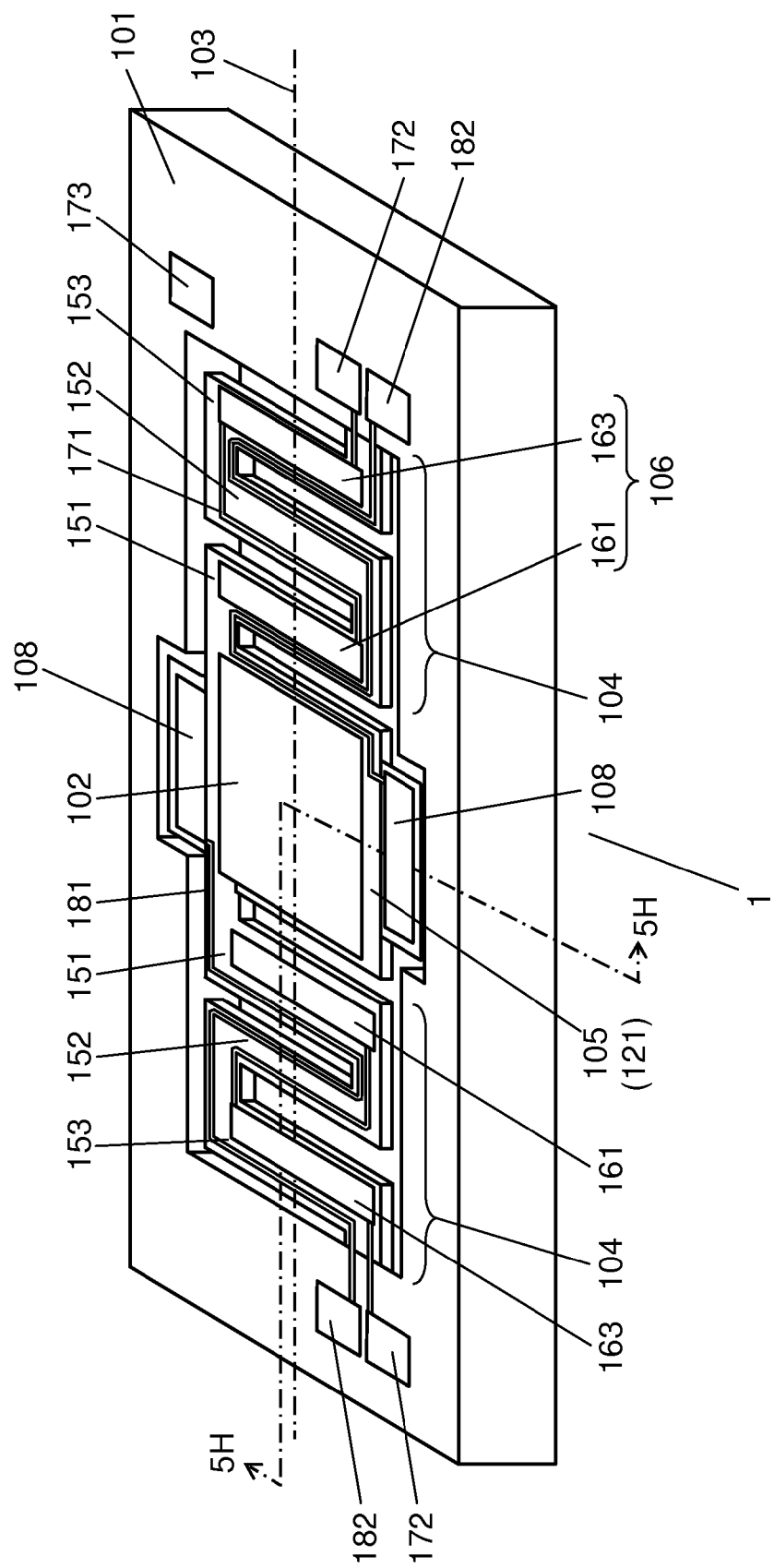
FIG. 1 is a perspective view of an optical reflecting device according to a first exemplary embodiment of the present invention.

An optical reflecting device according to a first exemplary embodiment of the present invention will now be described with reference to drawings. FIG. 1 is a perspective view of optical reflecting device 1 according to the present exemplary embodiment.

Optical reflecting device 1 includes movable plate 105, support portions 104 as first support portions, drive parts 106 as first drive parts, fixed frame 101, and monitor part 108 for detecting the rotation of movable plate 105. Movable plate 105, which is disposed in fixed frame 101, includes reflecting surface 121 on which mirror part 102 is formed. Support portions 104 are also disposed in fixed frame 101, and are connected to movable plate 105. First drive parts 106 are provided on support portions 104 so as to rotate movable plate 105 about rotation axis 103 as a first axis. Fixed frame 101 as a first frame, is connected to support portions 104. In other words, fixed frame 101 and movable plate 105 are coupled to each other via the pair of support portions 104 in a manner that movable plate 105 can rotate about rotation axis 103. Movable plate 105 is rotated about rotation axis 103 by drive parts 106 disposed in optical reflecting device 1.

Monitor part 108 extends from a portion, which is most distant from rotation axis 103, of the outer periphery of movable plate 105. More specifically, monitor part 108 is formed at an end away from rotation axis 103. Monitor part 108 is deformed in accordance with the rotation of movable plate 105 about rotation axis 103. By detecting the deformation, monitor part 108 can detect the drive state of movable plate 105 (mirror part 102).

Each of support portions 104 has a meandering shape in which vibrating beams 151-153 are connected together in an accordion fold. Vibrating beams 151-153 are made of silicon.

Each of drive parts 106 is formed of drivers 161 and 163. Driver 161 is formed on vibrating beam 151, whereas driver 163 is formed on vibrating beam 153. Drivers 161 and 163 each include a piezoelectric body, and upper and lower electrodes (not shown) respectively formed on and under the piezoelectric body.

The upper electrodes of drivers 161 and 163 are coupled to each other via wiring electrode 171 and are connected to driving electrode pad 172. The lower electrodes of drivers 161 and 163 are coupled to each other via wiring electrode 171 and are connected to lower electrode pad 173. In wiring electrode 171, when necessary, the upper and lower electrodes are isolated from each other via an insulating layer. Applying a voltage to the piezoelectric body through driving electrode pad 172 and lower electrode pad 173 bends and deforms vibrating beams 151 and 153. The bending and deformation allows movable plate 105 to rotate about rotation axis 103.

It is possible to perform resonant driving by making the frequency of the voltage applied to drive parts 106 coincide with the frequency of the natural vibration mode in which movable plate 105 is rotated about rotation axis 103. This allows movable plate 105 to rotate at a large angle even when a low voltage is applied.

Figure 2A:
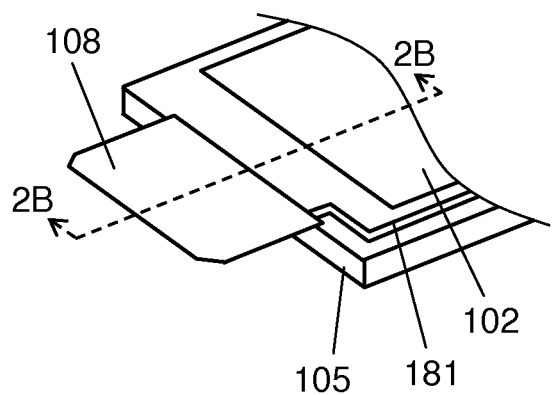
FIG. 2A is a perspective view of a monitor part of the optical reflecting device shown in FIG. 1.
Figure 2B:
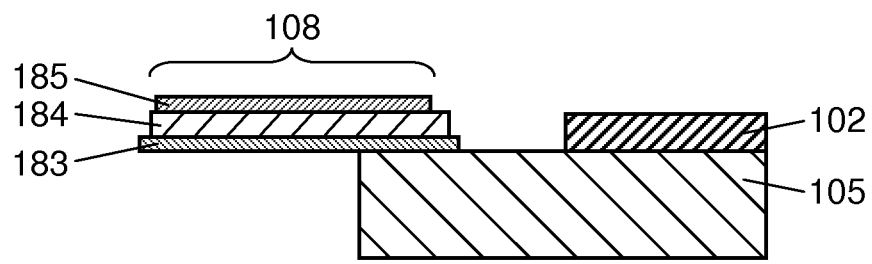
FIG. 2B is a sectional view of the monitor part shown in FIG. 2A.
Figure 2C:
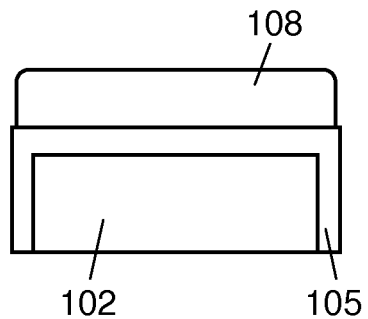
FIG. 2C is a top view showing a shape of the monitor part shown in FIG. 2A.
Figure 2D:
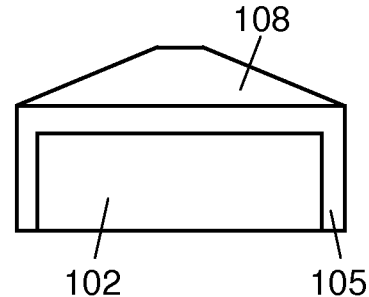
FIG. 2D is a top view showing another shape of the monitor part of the optical reflecting device shown in FIG. 1.

Monitor part 108 will now be described with reference to FIGS. 2A to 2D. FIG. 2A is a perspective view of monitor part 108, and FIG. 2B is a sectional view taken along line 2B-2B. FIGS. 2C and 2D are top views showing variation of the shapes of monitor part 108.

Movable plate 105 and support portions 104 are made, for example, of 100 μm-thick silicon. Monitor part 108 includes lower electrode 183, upper electrode 185, and piezoelectric body 184 interposed between these electrodes. These components together form a laminated structure. Lower electrode 183 is made, for example, of 370 nm-thick platinum. Piezoelectric body 184 is made, for example, of 3 μm-thick lead zirconate titanate (PZT). Upper electrode 185 is made, for example, of 300 nm-thick gold.

Monitor part 108 is subjected to inertia force generated when movable plate 105 rotates about rotation axis 103. Monitor part 108, which is much thinner than movable plate 105, deforms easily and strains under the inertia force. The strain distorts piezoelectric body 184, thereby generating an electrical signal. The generated electrical signal can be taken out through monitor electrode pad 182 connected to monitor wiring 181. As a result, the motion of mirror part 102 (movable plate 105) can be detected.

In this configuration, the mass of monitor part 108 is much smaller than the total mass of drivers 161, 163 and mirror part 102. This allows the detection of the rotation of mirror part 102 with hardly any influence on properties to rotate mirror part 102, such as resonance frequency. In addition, since the inertia force is the force applied according to the acceleration of an object, that is, the motion of mirror part 102, the motion of mirror part 102 itself can also be detected.

Monitor part 108 can be disposed not on a structural element to rotate movable plate 105, such as vibrating beams 151-153 or drivers 161 and 163, but on movable plate 105. This allows monitor part 108 to be disposed without reducing the drive efficiency, so that movable plate 105 can be rotated at a desired angle only by the application of a low voltage. As a result, optical reflecting device 1 requires low power consumption.

As shown in FIG. 2C, monitor part 108 can be formed by simply disposing a monitoring element made of a laminated thin film of rectangular shape at an edge of mirror part 102. Alternatively, as shown in FIG. 2D, monitor part 108 can be formed in the shape of a trapezoid or triangle having a narrow width in the direction of projecting from movable plate 105. In this case, the stress applied to the base of monitor part 108 can be efficiently changed into an electrical signal, while reducing the size of monitor part 108.

Figure 3A:
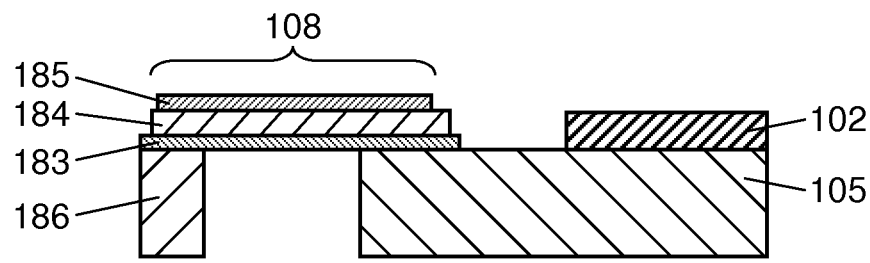
FIG. 3A is a sectional view in which a weight is added to the monitor part shown in FIG. 2A.

Furthermore, as shown in FIG. 3A, it is possible to attach weight 186 made of silicon to the edge of the monitoring element formed of the laminated thin film composing monitor part 108. FIG. 3A is a sectional view of the configuration which includes weight 186. This configuration allows the application of a larger inertia force, thereby providing a larger monitor signal.

Figure 3B:
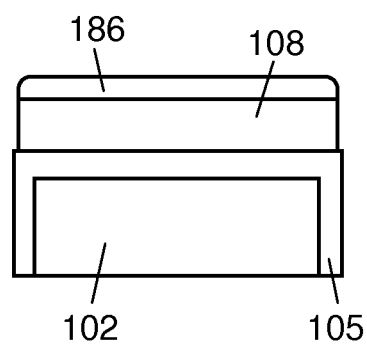
FIG. 3B is a top view showing a shape of the monitor part shown in FIG. 3A.
Figure 3C:
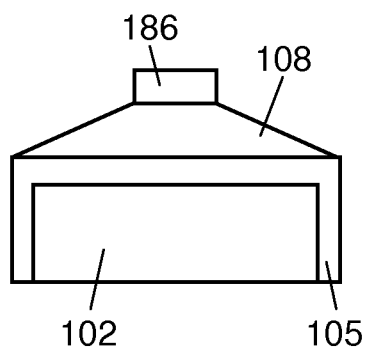
FIG. 3C is a top view showing another shape of the monitor part shown in FIG. 3A.
Figure 3D:
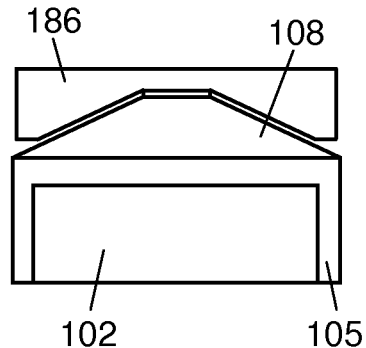
FIG. 3D is a top view showing further another shape of the monitor part shown in FIG. 3A.

FIGS. 3B-3D are top views showing examples of the shape of monitor part 108 to which weight 186 is added. In the configuration shown in FIG. 3B, weight 186 is attached to the edge of monitor part 108 shown in FIG. 2C. In the configuration shown in FIG. 3C, weight 186 is attached to the edge of monitor part 108 shown in FIG. 2D. In the configuration shown in FIG. 3D, weight 186 is attached along the edge and oblique sides of monitor part 108 shown in FIG. 2D. As weight 186 increases, the inertia force increases, which preferably increases the monitor signal.

Figure 4:
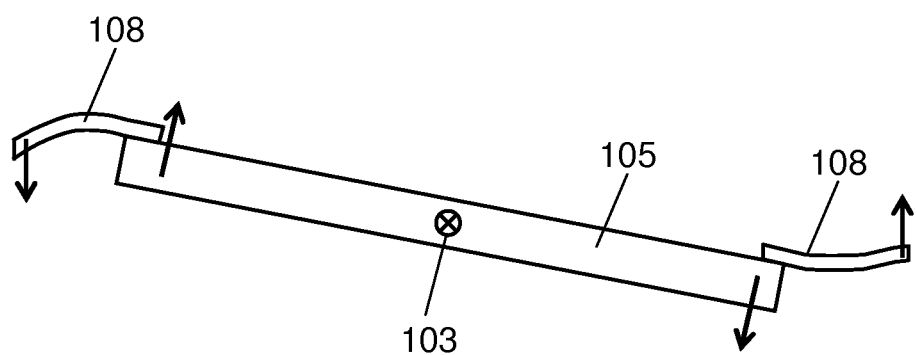
FIG. 4 is a schematic diagram showing the deformation of the monitor parts of the optical reflecting device shown in FIG. 1 when the mirror part rotates.

In order to detect the motion of movable plate 105 including mirror part 102 more accurately, a plurality of monitor parts 108 may be disposed symmetrical to each other with respect to rotation axis 103 if necessary. FIG. 4 shows the deformation of monitor parts 108 when movable plate 105 rotates. The plurality of monitor parts 108, which are disposed symmetrical to each other with respect to rotation axis 103, deform symmetrically in response to the rotation of movable plate 105. Therefore, by reversing the phase of the signal from one of monitor parts 108 and adding the signals together, noise, etc can be reduced. This allows more accurate detection of the driving of mirror part 102.

The inertia force detected by monitor parts 108 increases with increasing deflection angle of movable plate 105. Therefore, the deflection angle of mirror part 102 can be controlled by performing feedback control with a signal capable of being detected by monitor parts 108.

A method of fabricating optical reflecting device 1 including a piezoelectric actuator composed of a lower electrode, a piezoelectric body, and an upper electrode will now be described with reference to FIGS. 5A to 5H. FIG. 5H is a schematic sectional view taken along line 5H-5H of FIG. 1.

Figure 5A:
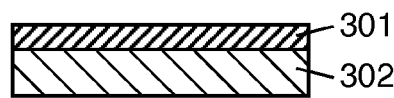
FIG. 5A is a schematic sectional view showing a step of fabricating the optical reflecting device shown in FIG. 1.

As shown in FIG. 5A, an SOI (silicon on insulator) substrate is prepared which includes active layer 301 and BOX layer (buried oxide layer) 302. The thickness of active layer 301 equals to the thickness of the vibrating beams. Therefore, it is necessary that, in the prepared substrate, active layer 301 has a thickness corresponding to the thickness of desired drive parts. In the present exemplary embodiment, active layer 301 of the prepared SOI substrate has a thickness of, for example, 100 μm.

Figure 5B:
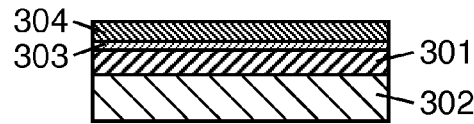
FIG. 5B is a schematic sectional view showing a step subsequent to the step of FIG. 5A in the method of fabricating the optical reflecting device.

Next, a silicon oxide film as an insulating film (not shown) is formed on active layer 301 of the SOI substrate. Then, lower electrode 303 is formed on the silicon oxide film by a thin film process such as sputtering or deposition as shown in FIG. 5B. After this, a layer of piezoelectric body 304 is formed on lower electrode 303 by, for example, sputtering. It is preferable that an orientation control layer (not shown) made of an oxide dielectric containing lead and titanium be formed between piezoelectric body 304 and lower electrode 303. It is more preferable that the orientation control layer be made of lead titanate added with lanthanum and magnesium (PLMT). This improves the polarization characteristics of piezoelectric body 304, thereby allowing the piezoelectric actuator to have high piezoelectric properties.

Figure 5C:
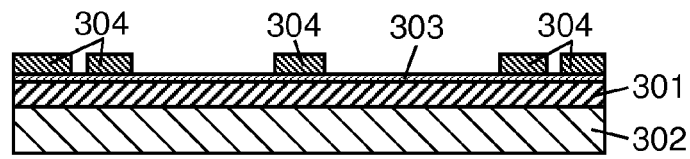
FIG. 5C is a schematic sectional view showing a step subsequent to the step of FIG. 5B in the method of fabricating the optical reflecting device.
Figure 5D:
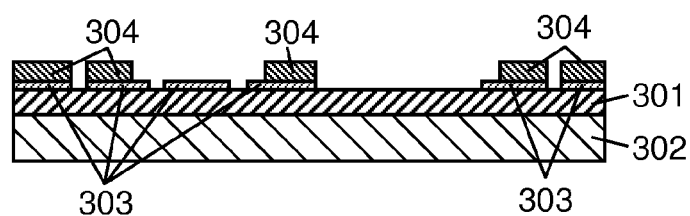
FIG. 5D is a schematic sectional view showing a step subsequent to the step of FIG. 5C in the method of fabricating the optical reflecting device.

Next, as shown in FIG. 5C, piezoelectric body 304 is patterned by photolithography and etching. Then, as shown in FIG. 5D, lower electrode 303 is patterned by photolithography and etching. The etching used for lower electrode 303 and piezoelectric body 304 can be dry etching, wet etching, or a combination thereof. The dry etching is performed using, for example, fluorocarbon-based etching gas or $SF_6$ gas. Alternatively, piezoelectric body 304 can be wet-etched using a mixed solution of fluorinated acid, nitric acid, acetic acid, and hydrogen peroxide, and then patterned. Then, lower electrode 303 can be dry-etched and patterned.

Figure 5E:
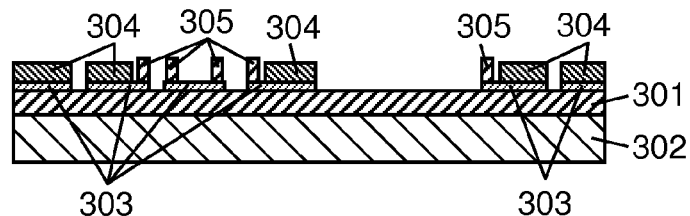
FIG. 5E is a schematic sectional view showing a step subsequent to the step of FIG. 5D in the method of fabricating the optical reflecting device.

Next, as shown in FIG. 5E, insulating layer 305 is formed in a region where wiring electrode 171 shown in FIG. 1 is to be formed. Insulating layer 305 may be formed by preparing an insulating film by CVD or sputtering, and then patterning the film by photolithography and etching. Alternatively, insulating layer 305 may be formed by patterning a permanent resist by photolithography.

Figure 5F:
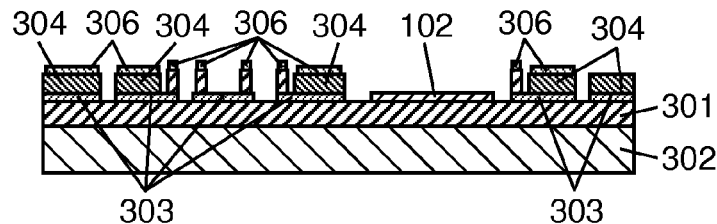
FIG. 5F is a schematic sectional view showing a step subsequent to the step of FIG. 5E in the method of fabricating the optical reflecting device.

Next, as shown in FIG. 5F, titanium-gold layer 306, which is to be either the upper electrode or its wiring, is formed. In titanium-gold layer 306, the titanium film under the gold film is formed to increase the adhesion with piezoelectric body 304 made, for example, of a PZT thin film. The titanium can be replaced by other metals such as chromium to increase the adhesion between piezoelectric body 304 and the upper electrode. Between the titanium film and the gold film, there is provided a firm diffusion layer, thereby allowing the piezoelectric actuator to have high adhesive strength.

Titanium-gold layer 306 including the upper electrode is patterned also by photolithography and etching. The etchant used for titanium-gold layer 306 can be a mixture of an iodine-potassium iodide solution and an ammonium hydroxide-hydrogen peroxide solution.

As one example, lower electrode 303 is made of 370 nm-thick platinum; piezoelectric body 304 is 3 μm thick; and in titanium-gold layer 306 composing the upper electrode, the titanium part is 10 nm thick, and the gold part is 300 nm thick.

If necessary, mirror part 102 is provided with a metal thin film as an optical reflection film made of silver or aluminum having excellent optical reflection characteristics. The metal thin film is patterned by photolithography and etching. The metal thin film may be formed only on necessary regions using a metal mask or the like.

Figure 5G:
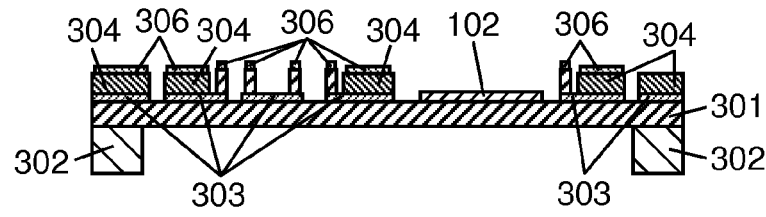
FIG. 5G is a schematic sectional view showing a step subsequent to the step of FIG. 5F in the method of fabricating the optical reflecting device.
Figure 5H:
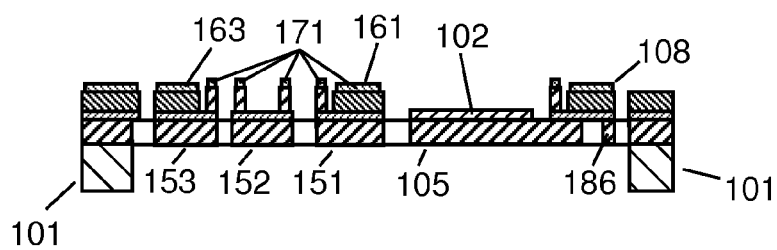
FIG. 5H is a schematic sectional view showing a step subsequent to the step of FIG. 5G in the method of fabricating the optical reflecting device.

Next, as shown in FIG. 5G, BOX layer 302, which is the base of the SOI substrate, is etched from the rear side by photolithography and etching except for the region that is to be fixed frame 101. BOX layer 302 can be etched by, for example, wet etching. However, when it is desired to process vertically so as to achieve a fine structure, BOX layer 302 can be etched by alternately applying $SF_6$ gas and $C_4F_8$ gas, which suppresses etching.

Finally, as shown in FIG. 5H, active layer 301 of the SOI substrate is patterned again from the rear side by photolithography, and then etched except for vibrating beams 151-153, which are to be support portions 104, and movable plate 105. Removing those regions of active layer 301 which are to be monitor parts 108 allows monitor parts 108 to have a thin-film structure composed of piezoelectric body 304, the upper electrode, and the lower electrode 303. If necessary, the region of active layer 301 which corresponds to weight 186 may be left. In the photolithography in this case, a resist can be uniformly formed and patterned by, for example, spray coating also on the substrate having a step portion formed at the first rear-side processing.

Through the above-described procedure, optical reflecting device 1 shown in FIG. 1 is completed.

Support portions 104 each have a meandering structure in the present exemplary embodiment, but may alternatively have a torsion beam structure. Monitor parts 108 include piezoelectric body 304 in order to detect the degree of deformation, but may alternatively include an element that changes an electrical signal according to the degree of deformation, such as a strain resistance element. Monitor parts 108 can detect the state of rotation of movable plate 105 without depending on the configuration of support portions 104 or drivers 161 and 163. In other words, monitor parts 108 do not detect the degree of deformation of support portions 104 or drivers 161 and 163. Therefore, the state of rotation of movable plate 105 (mirror part 102) can be detected without decreasing the drive efficiency. As a result, optical reflecting device 1 has low power consumption.

Second Exemplary Embodiment

An optical reflecting device according to a second exemplary embodiment of the present invention will now be described with reference to FIG. 6. FIG. 6 is a top view of optical reflecting device 501 according to the present exemplary embodiment.

Optical reflecting device 501 includes fixed frame 502 as a first frame, movable frame 503 as a second frame disposed in fixed frame 502, and mirror part 504 disposed in movable frame 503. Mirror part 504 and movable frame 503 are held by a pair of second support portions 506 so that mirror part 504 can rotate about second rotation axis 510. Fixed frame 502 and movable frame 503, on the other hand, are held by a pair of first support portions 505 so that movable frame 503 can rotate about first rotation axis 509.

Each of first support portions 505 has a meandering structure in which four vibrating beams 5051-5054 are connected together in an accordion fold. Vibrating beams 5051-5054 are made of silicon and first drivers 5071-5074 are provided thereon, respectively. Each of first drivers 5071-5074 forming a first drive part has a laminated structure formed of a piezoelectric body, an upper electrode, and a lower electrode (none shown). Applying a voltage to each piezoelectric body bends and deforms vibrating beams 5051-5054 so as to rotate movable frame 503 about first rotation axis 509.

The rotation angle of movable frame 503 can be increased by reversing the phases of two adjacent ones of first drivers 5071-5074 to each other. More specifically, first drivers 5071 and 5073 may be supplied with electrical signals in-phase with each other, and first drivers 5072 and 5074 may be supplied with electrical signals in-phase with each other. The electrical signals to be applied to first drivers 5071 and 5073 may be different in phase by 180 degrees from those to be applied to first drivers 5072 and 5074.

Each of second support portions 506 also has a meandering structure in which three vibrating beams 5061-5063 are connected together in an accordion fold. Vibrating beams 5061-5063 are made of silicon and second drivers 5081-5083 are provided thereon, respectively. Each of second drivers 5081-5083 forming a second drive part has a laminated structure formed of a piezoelectric body, an upper electrode, and a lower electrode (none shown). Applying a voltage to each piezoelectric body bends and deforms vibrating beams 5061-5063 so as to rotate mirror part 504 about second rotation axis 510.

Thus, in the present exemplary embodiment, mirror part 504, second support portions 506, second drivers 5081-5083, and movable frame 503 as the second frame together correspond to movable plate 105 of the first exemplary embodiment. Second support portions 506 are connected to mirror part 504. Second drivers 5081-5083 are provided on second support portions 506 so that mirror part 504 can rotate about second rotation axis 510, which is substantially orthogonal to first rotation axis 509. Inside movable frame 503, mirror part 504 and second support portions 506 is located and movable frame 503 is connected at its inside to second support portions 506 and is connected at its outside to first support portions 505.

The rotation angle of mirror part 504 can be increased by reversing the phases of the voltages of adjacent ones of the beams to each other. More specifically, second driver 5081 and 5083 may be supplied with electrical signals in-phase with each other, whereas second driver 5082 may be supplied with an electrical signal different in phase by 180 degrees from those to be applied to second drivers 5081 and 5083.

In optical reflecting device 501 used for projecting images, it is required to rotate mirror part 504 about second rotation axis 510 at a comparatively high driving frequency of 10 kHz or more. Therefore, it is common to use resonance. In this case, second drivers 5081 and 5083 are provided, but second driver 5082 is not provided. Second drivers 5081 and 5083 are supplied with electrical signals of the same frequency as that in the natural vibration mode in which mirror part 504 rotates about second rotation axis 510. This configuration allows resonant driving, thereby largely rotating mirror part 504.

Figure 7:
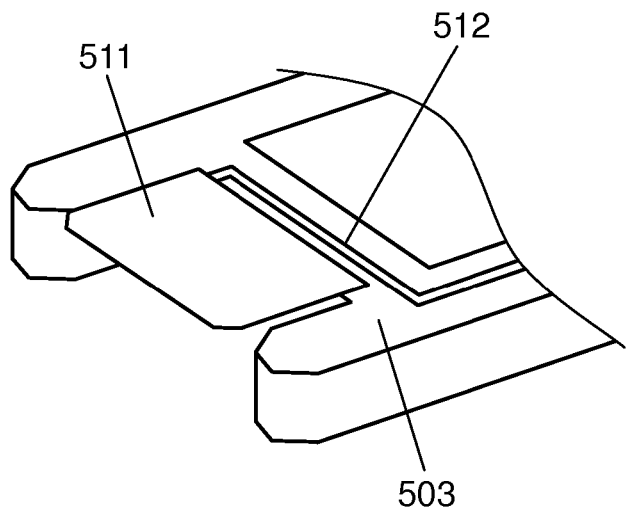
FIG. 7 is a perspective view of a monitor part of the optical reflecting device shown in FIG. 6.

Monitor part 511 is disposed at an end of movable frame 503. The end is distant from first rotation axis 509. FIG. 7 is an enlarged perspective view of a region where monitor part 511 is disposed. Movable frame 503 is formed of a 300 μm-thick silicon substrate, and surrounds mirror part 504. Similar to monitor part 108 of the first exemplary embodiment, monitor part 511 has a laminated structure formed of a lower electrode, a piezoelectric body, and an upper electrode.

Monitor part 511 is deformed and strained by the inertia force generated when movable frame 503 rotates about first rotation axis 509. As a result, the piezoelectric body of monitor part 511 is strained, thereby generating an electrical signal. The generated electrical signal can be taken out through wiring portion 512. Wiring portion 512 includes an insulating layer to prevent short circuits between the upper and lower electrodes from occurring. Since the inertia force is applied according to the acceleration of an object, that is, the motion of movable frame 503, it is possible to take out an electrical signal corresponding to the motion of movable frame 503. The above-described structure and configuration are similar to those of the first exemplary embodiment.

When movable frame 503 rotates, monitor part 511 deforms according to the inertia force. Therefore, it is preferable that monitor part 511 be as far away from first rotation axis 509 as possible. If a pair of monitor parts 511 are disposed symmetrical to each other with respect to the rotation axis, they will deform symmetrically. By reversing the phase of the signal from one of the pair of monitor parts 511 and adding the signals together, noise, etc. can be reduced, thereby allowing more accurate detection of the motion of movable frame 503.

When optical reflecting device 501 rotatable in two axial directions is used for display, it is often the case that a low frequency of 15 to 60 Hz is used for low-speed rotation (driving) about first rotation axis 509, and that non-resonant driving is performed using a saw-tooth wave drive signal. In order to detect the motion of movable frame 503, it is possible to dispose the monitor part in, for example, first drivers 5071-5074, which cause deformation to rotate movable frame 503. In the case of resonant driving, the motion of movable frame 503 can be detected by providing the monitor part in a part of the portions that cause deformation.

In the case of non-resonant driving, on the other hand, it is necessary to provide a monitor part in each of the portions that cause deformation. Therefore, when each of first support portions 505 has a meandering structure, monitor parts are required to be disposed in vibrating beams 5051-5054, respectively. An increase in the total area of the monitor parts, however, decreases the area of first drivers 5071-5074, and hence decreases the drive efficiency.

Monitor parts 511, on the other hand, extend from those portions, which are most distant from first rotation axis 509, of the outer periphery of movable frame 503 as components of the movable plate. This allows the motion of movable frame 503 to be detected directly while maintaining the area of the drive parts and the drive efficiency even at the non-resonant driving.

Note here that each of first support portion 505 and second support portion 506 has a meandering shape in the present exemplary embodiment, but may alternatively has a torsion beam structure. Monitor parts 511 can detect the rotation of movable frame 503 without depending on the configuration of first drivers 5071-5074 or second drivers 5081-5083. In addition, monitor parts 511 do not detect the degree of deformation of first drivers 5071-5074, second drivers 5081-5083, first support portions 505, or second support portions 506. Therefore, monitor parts 511 can detect the rotation of movable frame 503 without decreasing the drive efficiency, thereby contributing to a reduction in the power consumption of optical reflecting device 501.

Figure 8:
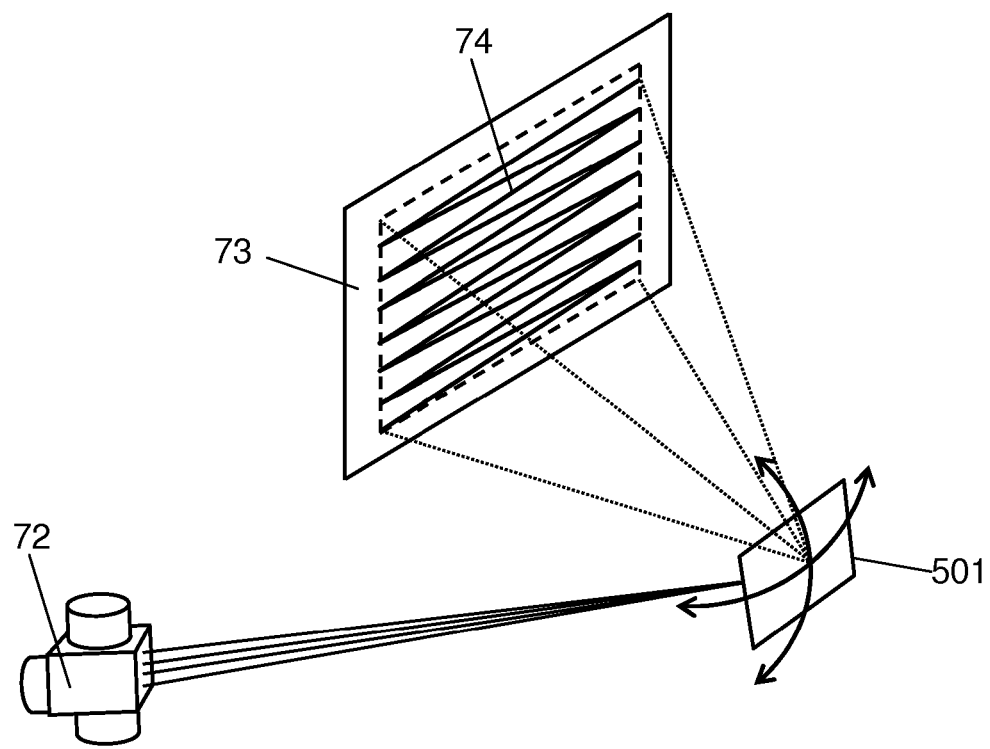
FIG. 8 is a schematic diagram of a display system including the optical reflecting device shown in FIG. 7.

FIG. 8 shows a laser scanning display system including optical reflecting device 501. The light emitted from light source 72 is reflected by mirror part 504 of optical reflecting device 501 and projected on screen 73. Rotating mirror part 504 about two orthogonal axes allows the laser beam to be scanned on screen 73. The output of light source 72 can be modulated in accordance with the position of mirror part 504 (that is, the position of the laser beam on screen 73) so as to obtain desired image 74. In this case, the position of mirror part 504 can be detected using the electrical signal detected by monitor parts 511.

If no reflecting surface is provided on movable plate 105 or mirror part 504, the configuration described in the first or second exemplary embodiment may be used as an actuator.

INDUSTRIAL APPLICABILITY

The optical reflecting device of the present invention has a monitoring function for detecting the drive state of the mirror part without reducing the drive efficiency. Therefore, the optical reflecting device performs high precision control while driving the mirror with low power consumption. Thus, the optical reflecting device can be used in an image projection device or an optical scanner such as a head-up display, a head-mounted display, and a laser printer.

The invention claimed is:

1. An optical reflecting device comprising:
   a movable plate having a reflecting surface;
   a first support portion connected to the movable plate;
   a first drive part provided on the first support portion and capable of rotating the movable plate about a first axis;
   a first frame connected to the first support portion and containing the movable plate and the first support portion; and
   a monitor part capable of detecting rotation of the movable plate,
   wherein the monitor part is disposed on the movable plate such that the monitor part is movable with movement of the movable plate,
   the monitor part is disposed on an outer periphery of the movable plate and extends outwardly from the movable plate in a direction heading away from the first axis, and
   the outer periphery is the most distant portion of the movable plate from the first axis.

2. The optical reflecting device according to claim 1, wherein the movable plate includes:
   a mirror part;
   a second support portion connected to the mirror part;
   a second drive part provided on the second support portion and rotating the mirror part about a second axis substantially orthogonal to the first axis; and
   a second frame containing the mirror part and the second support portion and being connected to the second support portion at an inside of the second frame and connected to the first support portion at an outside of the second frame.

3. The optical reflecting device according to claim 2, wherein each of the first and second support portions has a meandering shape.

4. The optical reflecting device according to claim 1, wherein the first support portion has a meandering shape.

5. The optical reflecting device according to claim 1, wherein the monitor part includes a lower electrode, an upper electrode, and a piezoelectric body interposed between the lower electrode and the upper electrode.

6. The optical reflecting device according to claim 1, wherein the monitor part is a strain resistance element.

7. The optical reflecting device according to claim 1, wherein the monitor part extends along the outer periphery in a direction parallel to the first axis.

8. The optical reflecting device according to claim 1, wherein the monitor part is disposed on a top surface of the movable plate.

9. An actuator comprising:
   a movable plate;
   a first support portion connected to the movable plate;
   a first drive part provided on the first support portion and capable of rotating the movable plate about a first axis;
   a first frame connected to the first support portion; and
   a monitor part capable of detecting rotation of the movable plate,
   wherein the monitor part is disposed on the movable plate such that the monitor part is movable with movement of the movable plate,
   the monitor part is disposed on an outer periphery of the movable plate and extends outwardly from the movable plate in a direction heading away from the first axis, and
   the outer periphery is the most distant portion of the movable plate from the first axis.

10. The actuator according to claim 9, wherein the monitor part includes a lower electrode, an upper electrode, and a piezoelectric body interposed between the lower electrode and the upper electrode.

11. The actuator according to claim 9, wherein the monitor part is a strain resistance element.

12. The actuator according to claim 9, wherein the monitor part extends along the outer periphery in a direction parallel to the first axis.

13. The actuator according to claim 9, wherein the monitor part is disposed on a top surface of the movable plate.

\* \* \* \* \*